US011027852B2

(12) United States Patent
Lafont et al.

(10) Patent No.: US 11,027,852 B2
(45) Date of Patent: Jun. 8, 2021

(54) ASSEMBLY FOR AIRCRAFT COMPRISING A PRIMARY MOUNTING PYLON STRUCTURE FIXED TO AN AIRFOIL BOX USING A BOLTED LINK

(71) Applicant: Airbus Operations SAS, Toulouse (FR)

(72) Inventors: Laurent Lafont, Pechbusque (FR); Stéphane Dida, Fontenilles (FR); Jérôme Colmagro, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 327 days.

(21) Appl. No.: 16/264,909

(22) Filed: Feb. 1, 2019

(65) Prior Publication Data
US 2019/0233129 A1 Aug. 1, 2019

(30) Foreign Application Priority Data
Feb. 1, 2018 (FR) ...................................... 1850868

(51) Int. Cl.
*B64D 27/26* (2006.01)
*B64C 3/18* (2006.01)
*B64D 27/18* (2006.01)

(52) U.S. Cl.
CPC .............. *B64D 27/26* (2013.01); *B64C 3/185* (2013.01); *B64C 3/187* (2013.01); *B64D 27/18* (2013.01); *B64D 2027/264* (2013.01)

(58) Field of Classification Search
CPC .............. B64D 27/26; B64D 2027/264; B64D 2027/266; B64D 27/12; B64D 27/18
See application file for complete search history.

(56) References Cited

U.S. PATENT DOCUMENTS

| 3,831,888 A | 8/1974 | Baker et al. |
| 2004/0129832 A1 | 7/2004 | Marche |

(Continued)

FOREIGN PATENT DOCUMENTS

| FR | 2836672 A1 | 9/2003 |
| FR | 2889163 A1 | 2/2007 |
| FR | 2915178 A1 | 10/2008 |

OTHER PUBLICATIONS

French Search Report; priority document.

*Primary Examiner* — Philip J Bonzell
*Assistant Examiner* — Ashesh Dangol
(74) *Attorney, Agent, or Firm* — Greer, Burns & Crain, Ltd.

(57) ABSTRACT

An assembly for an aircraft and comprising a wing comprising an airfoil box partly produced using a front spar, a mounting pylon arranged under the wing and comprising a primary structure formed as a primary box having a top spar extending at least partly under the airfoil box and having a slit, a bottom spar, lateral panels and a transverse reinforcing fixing rib, of which a bottom part is housed and fixed inside the primary structure and of which a top part passes through the slit. A fixing arrangement fixes the top part to the front spar. The fixing arrangement comprises a plurality of fixing bolts, where each fixing bolt fixes the top part to the front spar and has its axis at right angles to the fixing rib. Such an assembly allows the mounting pylon primary structure to be as close as possible to the wing.

7 Claims, 4 Drawing Sheets

(56) References Cited

U.S. PATENT DOCUMENTS

| | | | |
|---|---|---|---|
| 2008/0217467 A1* | 9/2008 | Lafont | B64D 27/18 244/54 |
| 2010/0090056 A1 | 4/2010 | Gardes et al. | |
| 2019/0202573 A1* | 7/2019 | Pautis | B64D 27/18 |

* cited by examiner

ASSEMBLY FOR AIRCRAFT COMPRISING A PRIMARY MOUNTING PYLON STRUCTURE FIXED TO AN AIRFOIL BOX USING A BOLTED LINK

CROSS-REFERENCES TO RELATED APPLICATIONS

This application claims the benefit of the French patent application No. 1850868 filed on Feb. 1, 2018, the entire disclosures of which are incorporated herein by way of reference.

FIELD OF THE INVENTION

The present invention relates to an assembly for an aircraft comprising a primary mounting pylon structure fixed to an airfoil box using a bolted link, and an aircraft comprising at least one such assembly.

BACKGROUND OF THE INVENTION

On existing aircraft, the engines, such as the jet engines, are suspended below the airfoil by complex mounting devices, also called "EMS" ("Engine Mounting Structure"), or even mounting pylons. The mounting pylons usually employed have a primary structure, also called rigid structure, often produced in the form of a box, that is to say, produced by the assembly of bottom and top spars connected to one another by a plurality of transverse reinforcing ribs situated inside the box and at the ends thereof. The spars are arranged as bottom and top faces, while lateral panels close the box as lateral faces. Furthermore, the mounting pylon is arranged in the top part of the engine, between the latter and the airfoil box. This clock position is called "12 o'clock."

As is known, the primary structure of these pylons is designed to allow the transmission to the airfoil of the static and dynamic loads generated by the engines, such as the weight, the thrust or even the different dynamic loads, particularly those linked to failure causes such as the loss of fan blades (FBO, "Fan Blade Out"), collapse of the front landing gear, dynamic landing, etc.

In the mounting pylons known from the state of the art, the transmission of the loads between its primary structure and the airfoil box is conventionally ensured by a set of attachments comprising a front attachment, a rear attachment, and an intermediate attachment, the latter being, in particular, intended to absorb the thrust loads generated by the engine. These attachments are conventionally interposed vertically between the airfoil box and the primary structure of the mounting pylon.

On recent engines, the diameter is becoming increasingly higher. For the dual-flow engines such as the turbojet engines, the high bypass ratio sought leads to a particularly high bulk being obtained, since an increase in the bypass ratio unavoidably creates an increasing of the diameter of the engine, and more particularly, an increasing of the diameter of its fan casing.

Consequently, with a ground clearance which is determined so as to remain acceptable from the safety point of view, the space remaining between the airfoil element and the engine is proving to be increasingly restrictive. Because of this, it is becoming difficult to install the mounting pylon and the various airfoil attachments in this remaining vertical space which is usually dedicated to this installation. This difficulty is all the greater since the loads conveyed are also of high intensities, and require appropriate dimensionings for the airfoil box and the primary structure. Indeed, the latter have to have dimensions that are sufficient to provide a mechanical strength capable of withstanding the passage of the loads from the engine to the airfoil element, with little deformation under stress in order not to degrade the aerodynamic performance levels of the propulsion system.

In the state of the art, many solutions have been proposed to bring the engine as close as possible to the airfoil element from which it is suspended, and do so in order to retain the requisite ground clearance.

Nevertheless, these solutions have to be improved on an ongoing basis to adapt to the increasingly higher fan casing diameters that are retained to satisfy the bypass ratio requirements.

SUMMARY OF THE INVENTION

One object of the present invention is to propose an assembly for an aircraft comprising a primary mounting pylon structure fixed to an airfoil box using a bolted link.

To this end, an assembly is proposed for an aircraft comprising:

- a wing comprising an airfoil box partly produced using a front spar,
- a mounting pylon arranged under the wing and comprising a primary structure in the form of a primary box having a top spar extending at least partly under the airfoil box and having a slit, a bottom spar, lateral panels and a transverse reinforcing rib, called fixing rib, of which a bottom part is housed and fixed inside the primary structure and of which a top part passes through the slit,
- fixing means which ensure the fixing of the top part to the front spar and where the fixing means comprise a plurality of fixing bolts, where each fixing bolt fixes the top part to the front spar and has its axis at right angles to the fixing rib.

Such an assembly makes it possible to bring the primary structure of the mounting pylon as close as possible to the wing.

Advantageously, the assembly comprises additional fixing means arranged between the top spar and the fixing rib.

Advantageously, the additional fixing means comprise a first central angle iron fixed to the top spar by first bolts with axis at right angles to the top spar, a second central angle iron facing the first central angle iron and fixed to the front spar by second bolts, where the first central angle iron and the second central angle iron are arranged on either side of the fixing rib, and additional bolts with axis at right angles to the fixing rib which fix the second central angle iron to the first central angle iron through the fixing rib.

Advantageously, the additional fixing means comprise, on either side of the first central angle iron, a first ply of the top spar, where each of the first plies has an inner face bearing against a face of the fixing rib; two second plies, where each second ply is arranged facing a first ply and has an inner face bearing against the other face of the fixing rib; and through bolts which pass through the fixing rib and the two facing plies so as to clamp the two plies against the fixing rib.

Advantageously, the fixing rib comprises at least two blades affixed against one another.

According to a particular embodiment, the fixing of the fixing bolts in the front spar is seal-tight.

According to another particular embodiment, the top part takes the form of a U, the assembly comprises, for each branch of the U, a plate inserted between the front spar and the branch of the U, each plate has a shoe which is pressed and fixed against the front spar and which has bores whose axes are at right angles to the fixing rib and which receive anchoring bolts which fix the shoe and the front spar, and the nut of each fixing bolt is incorporated in the plate.

Advantageously, the assembly comprises flexible washers arranged between the plate and the fixing rib and between the fixing rib and the head of each fixing bolt.

Advantageously, the primary box forming the primary structure has a rear closing rib closing the rear of the primary box, the airfoil box is also formed by a lower surface bottom skin, and the assembly comprises a rear attachment comprising two fittings, where each comprises a base fixed to the lower surface bottom skin by vertical bolts whose axes are at right angles to the lower surface bottom skin, and a wall which is parallel to the rear closing rib and fixed against the rear closing rib by horizontal bolts whose axes are at right angles to the rear closing rib, where the walls act as flexbeams allowing a differential displacement on X.

The invention also proposes an aircraft comprising at least one assembly as described above.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF THE PREFERRED EMBODIMENTS

Figure 1:
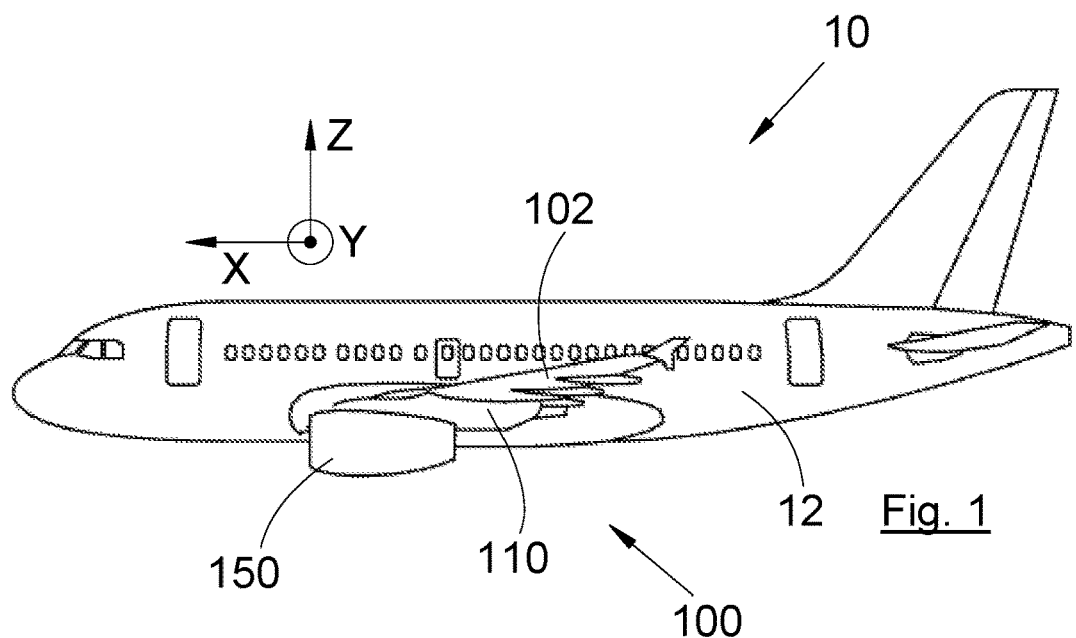
FIG. 1 shows a side view of an aircraft comprising an assembly according to the invention.

FIG. 1 shows an aircraft 10 comprising a fuselage 12 onto which are fixed two wings 102 (just one being visible in FIG. 1), each wing 102 forming an integral part of an assembly 100 according to the invention.

The assembly 100 supports an engine 150, in particular a dual-flow and double-body engine, such as a turbojet engine. The assembly 100 comprises not only the wing 102, but also a mounting pylon 110 arranged under the wing 102 and under which the engine 150 is suspended and which is interposed between the wing 102 and the engine 150.

Throughout the following description, and by convention, the direction X corresponds to the longitudinal direction of the assembly 100 which can also be likened to the longitudinal direction of the engine 150, this direction X being parallel to a longitudinal axis of the engine 150. Also, the direction Y corresponds to the direction oriented transversely relative to the assembly 100, that can also be likened to the transverse direction of the engine 150. Finally, the direction Z corresponds to the vertical or heightwise direction, these three directions X, Y and Z being mutually orthogonal.

The terms "front" and "rear" should be considered in relation to a direction of advance of the aircraft 10 encountered as a result of the thrust exerted by the engines 150, this direction being globally oriented in the direction X.

Figure 2:
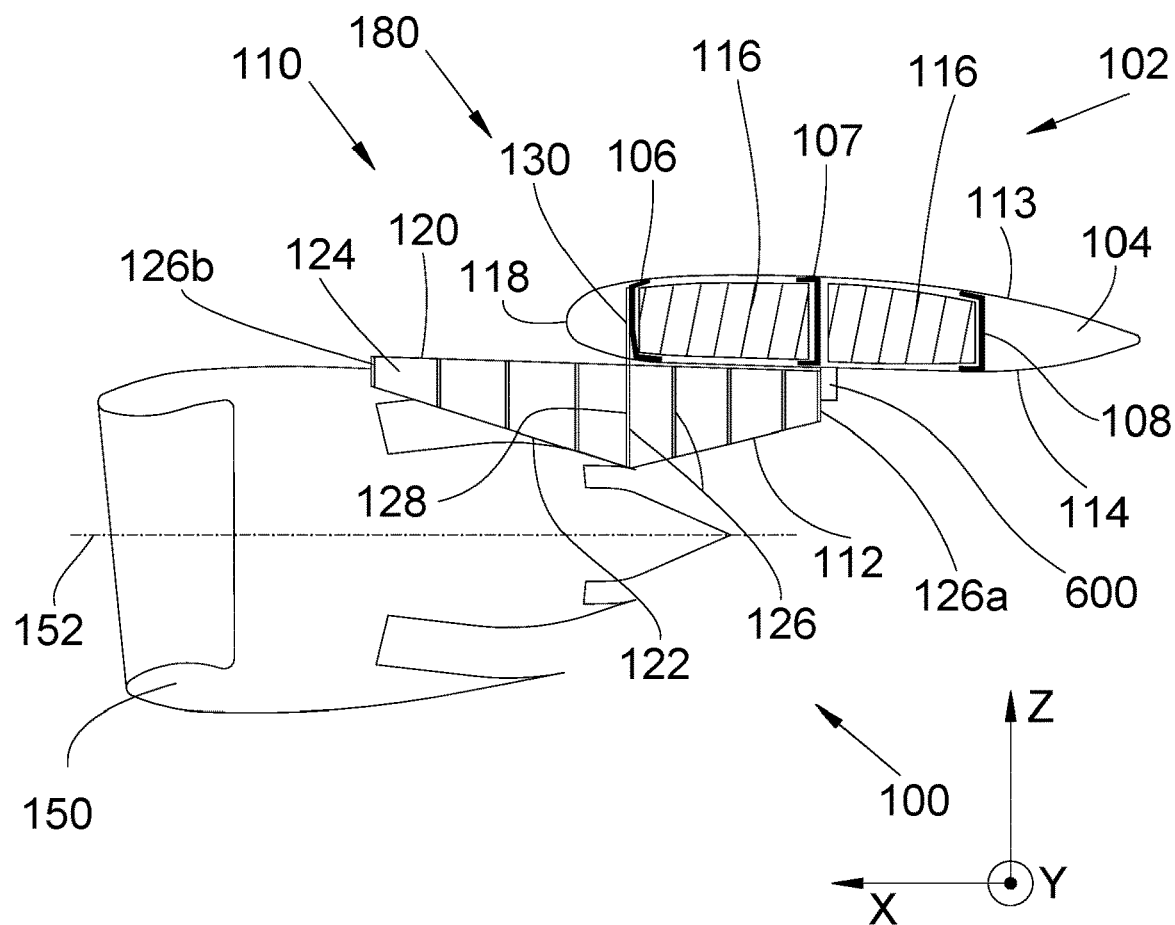
FIG. 2 shows a side view of the assembly according to the invention with its engine.

FIG. 2 represents the assembly 100 under which is suspended the engine 150, of longitudinal axis 152. The wing 102 of the assembly 100 comprises an airfoil box 104 extending in a direction of wingspan. The airfoil box 104 is formed by a front spar 106, a rear spar 108, an intermediate spar or inter-rib diaphragm 107, an upper surface top skin 113 and a lower surface bottom skin 114. The three spars 106, 108 and 107 extend in the direction of wingspan and are spaced apart from one another in a direction of the cord of the wing 102. Reinforcing internal ribs 116 substantially at right angles to the front spar 106 are housed inside the airfoil box 104. Furthermore, at the front of the airfoil box 104, the wing 102 comprises a cowl 118 forming the leading edge of the wing 102.

The assembly 100 also comprises the mounting pylon 110 which comprises a primary structure 112 in box form, called a primary box.

The primary structure 112, or rigid structure, allows the transmission to the airfoil box 104 of the static and dynamic loads generated by the engine 150. The primary box forming the primary structure 112 extends over all the length of the primary structure 112, in the direction X. The primary box has a conventional design, and it is delimited towards the top by a top spar 120, towards the bottom by a bottom spar 122, and laterally by lateral panels 124.

As can be seen in FIG. 2, the top spar 120 is situated at least partly under the airfoil box 104.

Furthermore, the primary box forming the primary structure 112 is equipped with transverse reinforcing ribs 126, 126a-b, preferably arranged substantially in planes YZ and distributed in the direction X. These are inner transverse ribs 126, a transverse reinforcing rib 126a closing the rear of the primary box, called rear closing rib, and a transverse reinforcing rib 126b closing the front of the primary box, called front closing rib.

The primary box has a transverse section YZ in generally rectangular or trapezoidal form, of tapered dimension along the direction X. Preferably, this transverse section narrows from a median portion, going towards the front and going towards the rear.

The fixing of the engine 150 onto the primary box is performed in a conventional manner which will not be detailed in the context of this invention. It is produced by conventional engine attachments, known to the person skilled in the art.

Figure 3:
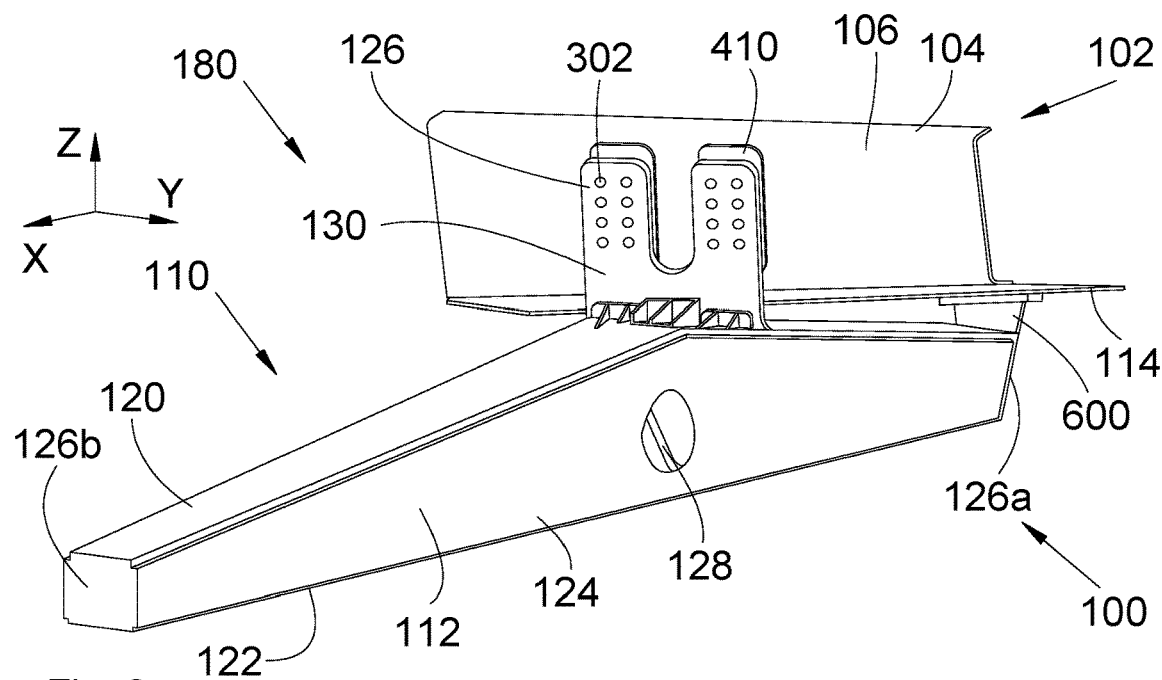
FIG. 3 shows a perspective view of the assembly according to the invention.
Figure 4:
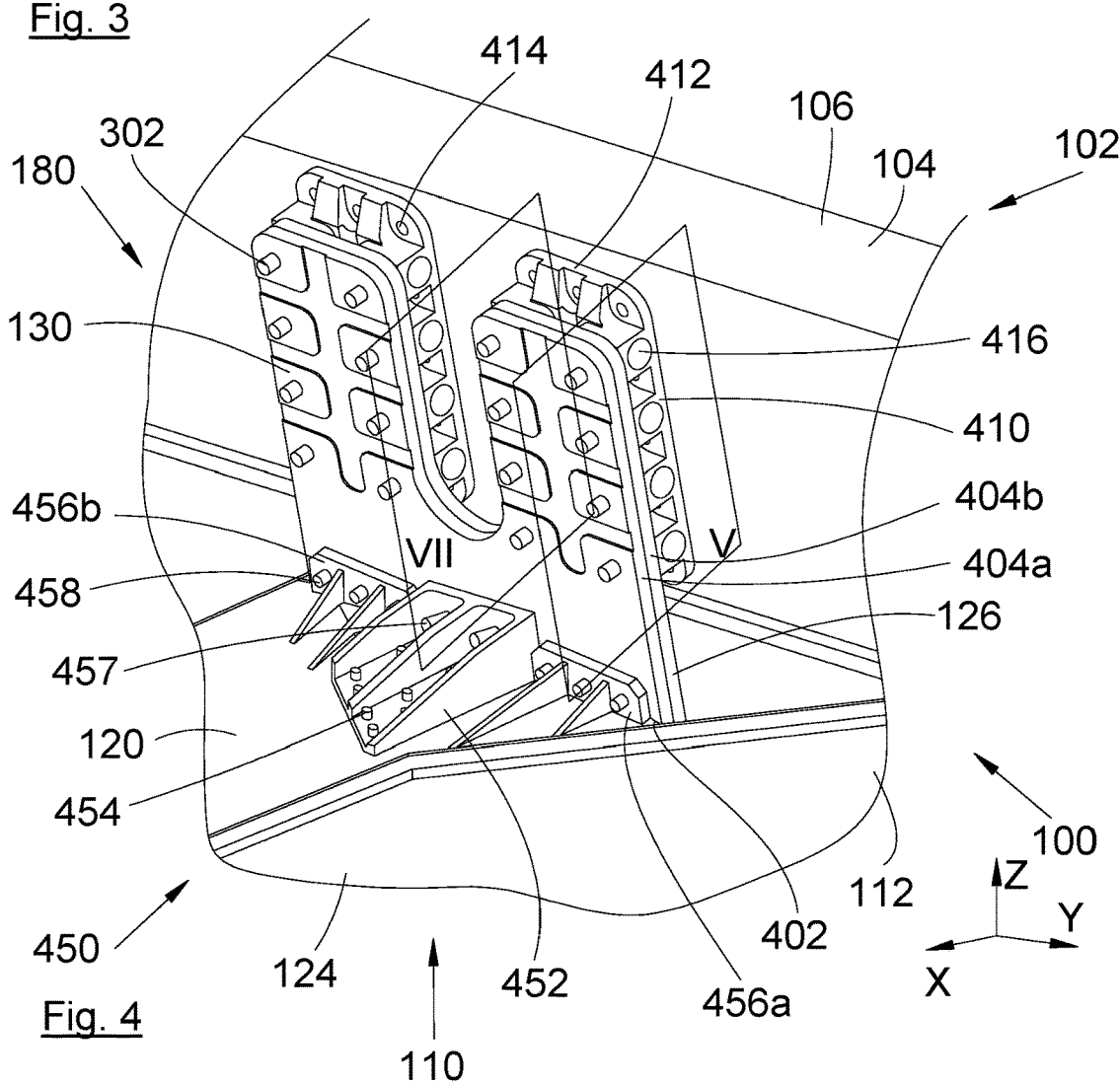
FIG. 4 shows an enlargement of the fixing means implemented in the assembly according to the invention.
Figure 5:
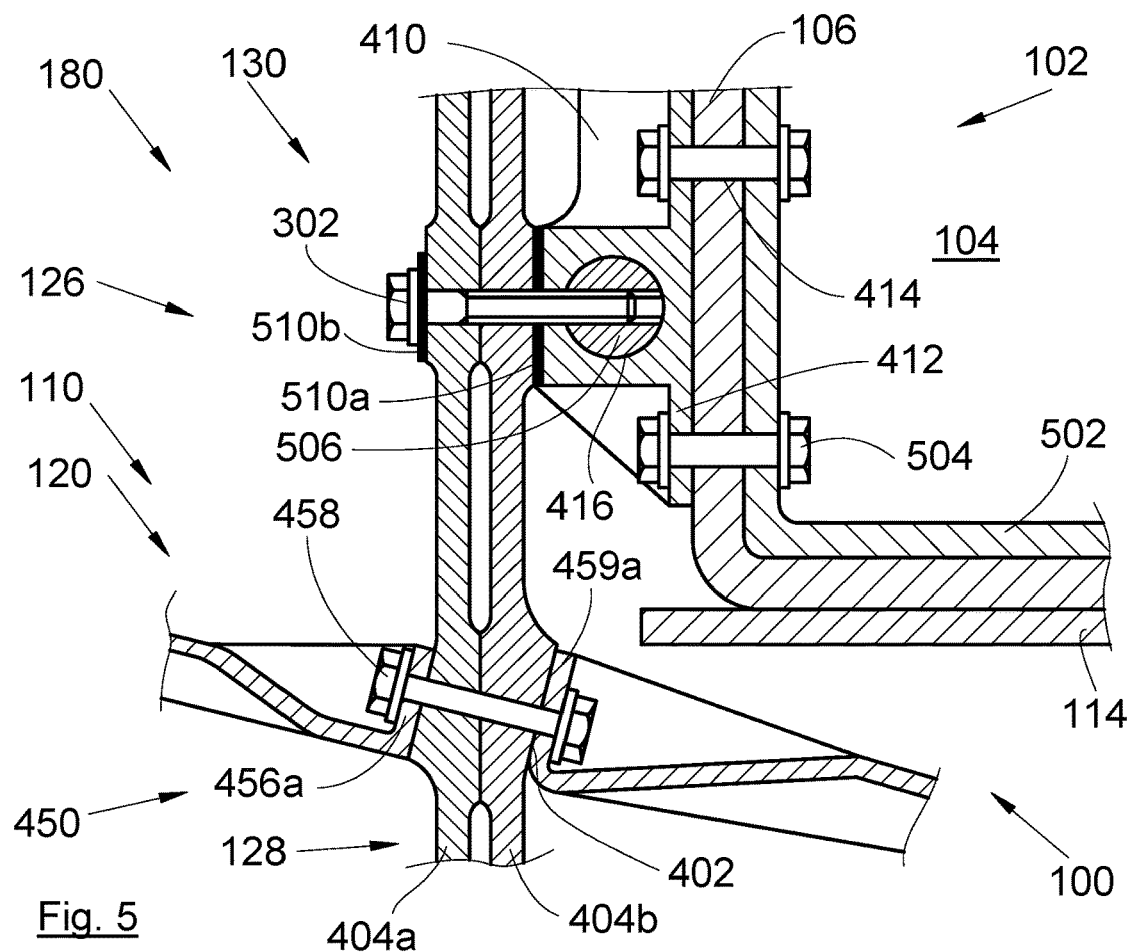
FIG. 5 shows a cross section along the plane V of FIG. 4 of the assembly according to the invention.

The assembly 100 also comprises fixing means 180 which ensure the fixing of the mounting pylon 110 to the wing 102. FIGS. 3 to 5 show the fixing means 180 implemented in the context of the invention.

In the context of the invention, the top spar 120 has a slit 402 which extends in a plane globally parallel to the front spar 106.

One of the transverse reinforcing ribs 126, here called fixing rib, which is substantially at the center of the primary box, has a bottom part 128 (seen through an exploded zone of the primary structure in FIG. 3) which is housed and fixed inside the primary structure 112 and a top part 130 which passes through the slit 402 to extend out of the primary box forming the primary structure 112.

Another possible embodiment is to consider that the top spar is continuous from the front to the rear of the primary box and that the fixing rib is composed of a bottom part 128 and a top part 130 which are fixed to one another by bolts passing through said top spar.

The fixing means 180 comprise a plurality of fixing bolts 302, where each fixing bolt 302 fixes the top part 130 to the front spar 106 and has its axis at right angles to the fixing rib 126. The fixing means 180 thus ensure the fixing of the top part 130 to the front spar 106.

The front spar 106 and the fixing rib 126 are parallel to one another and a rear face of the fixing rib 126 is facing a front face of the front spar 106.

Such an implementation allows for a space saving through a compact assembly, as well as an advantageous distribution of the loads in the airfoil box 104.

To ensure a certain flexibility of the assembly 100, the fixing rib 126 takes the form of a flexible blade which preferentially has a low transverse stiffness, taking care to ensure that the transverse stresses do not exceed a third of the stresses situated in the plane of the fixing rib 126.

In order to adjust the flexibility of the assembly 100, the fixing rib 126 can be composed of several flexible blades 404a-b affixed one against the other, and preferentially, in order to ensure safety in the event of a breaking of one of the blades, the fixing rib 126 comprises at least two blades 404a-b affixed one against the another.

In the embodiment of the invention presented in FIGS. 4 to 8, additional fixing means 450 are arranged between the top spar 120 and the fixing rib 126. These additional fixing means 450 here comprise a first central angle iron 452 which has a first wall fixed to the top spar 120 by first bolts 454 with axis at right angles to the top spar 120, and a second wall fixed to the front face of the fixing rib 126 which is oriented towards the front.

The additional fixing means 450 also comprise a second central angle iron 702 which has a first wall fixed to the front spar 106 and to the lower surface bottom skin 114 by second bolts 704 with axis at right angles to the top spar 120, and a second wall fixed to the rear face of the fixing rib 126 which is oriented towards the rear.

The first central angle iron 452 and the second central angle iron 702 are arranged substantially at the center of the slit 402 relative to its length, on either side of the fixing rib 126 and facing one another, that is to say, that the second wall of the first central angle iron 452 and the second wall of the second central angle iron 702 face one another.

The additional fixing means 450 also comprise additional bolts 457 with axis at right angles to the fixing rib 126, which pass through the fixing rib 126 and the second wall of the first central angle iron 452 and the second wall of the second central angle iron 702 so as to clamp the fixing rib 126 between the two second walls. The additional bolts 457 thus fix the second central angle iron 702 to the first central angle iron 452 through the fixing rib 126.

The first central angle iron 452 and the second central angle iron 702 are arranged outside of the primary box.

The additional fixing means 450 here also comprise, on either side of the first central angle iron 452, a first ply 456a-b of the top spar 120, where each of the first plies 456a-b has an inner face which bears against a face, here the front face, of the fixing rib 126.

The additional fixing means 450 also comprise two second plies 459a-b of the top spar 120, where each second ply 459a-b is arranged facing a first ply 456a-b and has an inner face which bears against the other face, here the face rear, of the fixing rib 126. The two second plies 459a-b are thus arranged on either side of the second central angle iron 702.

The additional fixing means 450 comprise through bolts 458 which pass through the fixing rib 126 and the two facing plies 456a-b, 459a-b so as to clamp the fixing rib 126 between the two plies 456a-b, 459a-b. In the embodiment of the invention presented in FIG. 5, the head of the through bolt 458 comes to bear against the outer face of the first ply 456a, opposite the inner face, and the nut comes to bear against the outer face of the second ply 459a-b, opposite the inner face, while the threaded stem passes through the two plies 456a and 459a-b and the fixing rib 126.

The thrust P from the engine 150 and passing through the mounting pylon 110 is transmitted to the wing 102 by decomposition along two load paths with a component L parallel to the front spar 106 transmitted to the front spar 106 by the fixing rib 126 and the fixing bolts 302, and a component N at right angles to the front spar 106 transmitted to the lower surface bottom skin 114 of the airfoil box 104 by the first central angle iron 452, the second central angle iron 702, the additional bolts 457, the first bolts 454 and the second bolts 704.

The fixing of the top part 130 to the front spar 106 can be done directly, that is to say that the fixing bolts 302 are fixed directly through the front spar 106, but, in so far as the airfoil box 104 is generally likely to contain fuel, the fixing of the fixing bolts 302 in the front spar 106 must be seal-tight and is produced for example by seal-tight studs.

In the embodiment of the invention presented in FIGS. 3 to 5, the top part 130 of the fixing rib 126 takes the form of a U and the assembly 100 comprises, for each branch of the U, a plate 410 which is fixed between the front face of front spar 106 and the rear face of the branch of the U, that is to say of the fixing rib 126. Each plate 410 therefore constitutes an interface inserted between the front spar 106 and the fixing rib 126.

In the embodiment of the invention presented in FIG. 5, the front spar 106 is reinforced by a bracket 502 housed behind the front spar 106 and which participates in the transmission of the component N.

Each plate 410 comprises a shoe 412 which is pressed and fixed against the front face of the front spar 106. The shoe 412 has bores 414 whose axes are at right angles to the fixing rib 126 and which receive anchoring bolts 504 which fix the shoe 412 to the front spar 106 by sandwiching the shoe 412 and the front spar 106, and, in the particular embodiment described here, also the bracket 502. The fixing of the shoe 412 to the front spar 106 is preferentially seal-tight.

The nut 506 of each fixing bolt 302 is then incorporated in the plate 410. In the embodiment of the invention presented in FIGS. 4 and 5, the nut 506 is a barrel nut which lodges in a cylindrical recess 416 of the plate 410.

In this particular embodiment, each fixing bolt 302 thus fixes the top part 130 to the front spar 106 through each plate 410.

In order to adjust the flexibility of the assembly 100 and reduce the loads linked to the axial displacement while maintaining the bowing capacity of the assembly 100, flexible washers 510a-b, for example made of elastomer, are arranged between the plate 410 and the fixing rib 126 and between the fixing rib 126 and the head of each fixing bolt 302. The flexible washers 510a-b allow a displacement on the axis of the bolts without flexurally loading the fixing rib 126. The aim is to allow the relative displacement of the rib 130 relative to the spar 106 of the wing (on the axis of the fixing bolts 302) without out-of-plane overloading thereof.

It is also possible to augment the flexibility of the assembly 100 by increasing the vertical distance between the through bolts 458 and the first row of fixing bolts 302.

Figure 6:
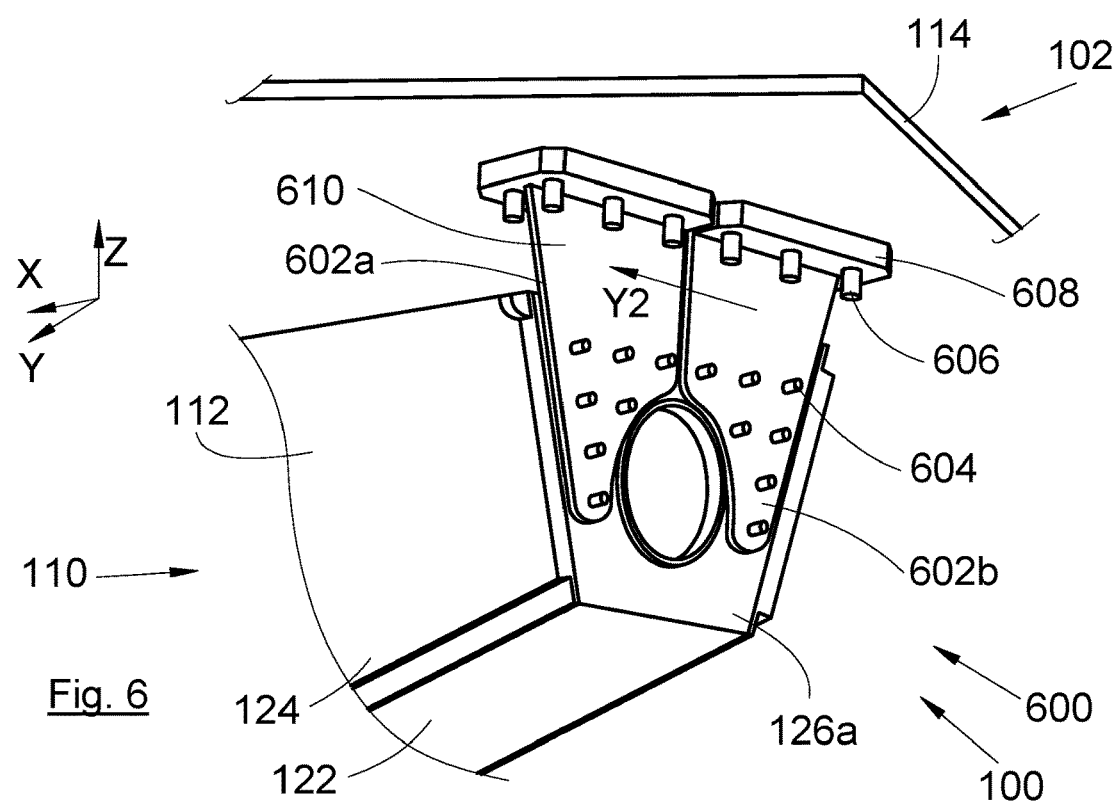
FIG. 6 shows a perspective view of a rear attachment between the mounting pylon and the wing.
Figure 7:
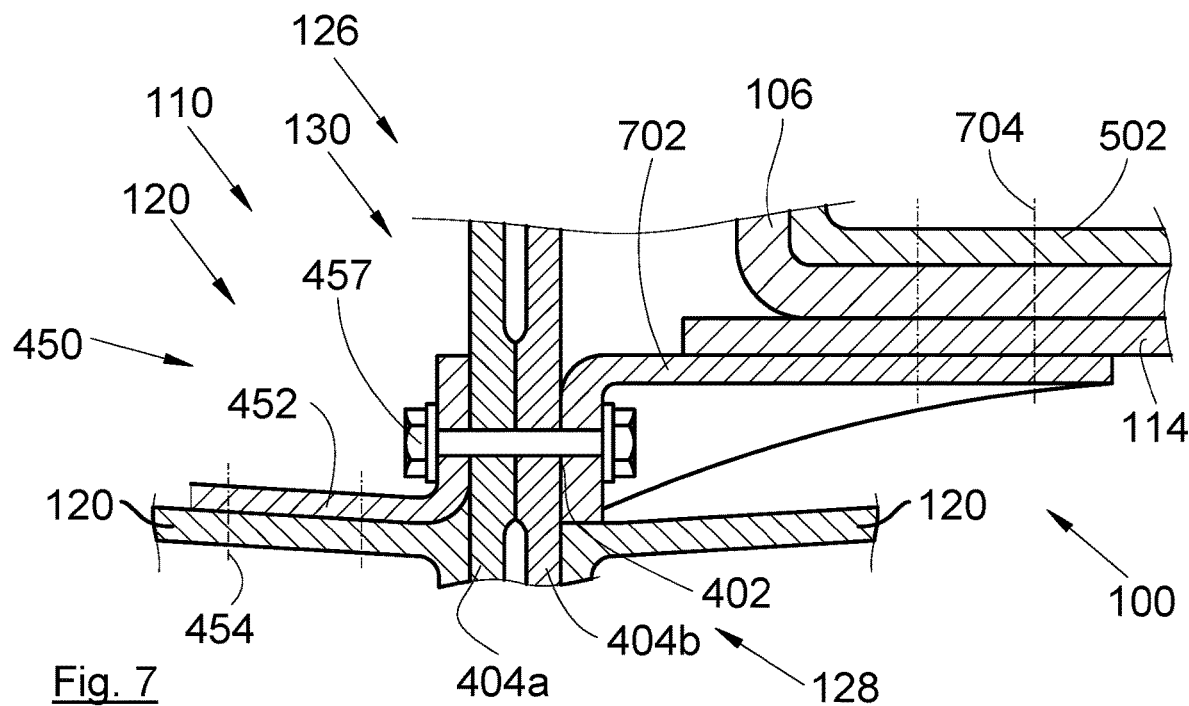
FIG. 7 shows a cross section along the plane VII of FIG. 4 of the assembly according to the invention.
Figure 8:
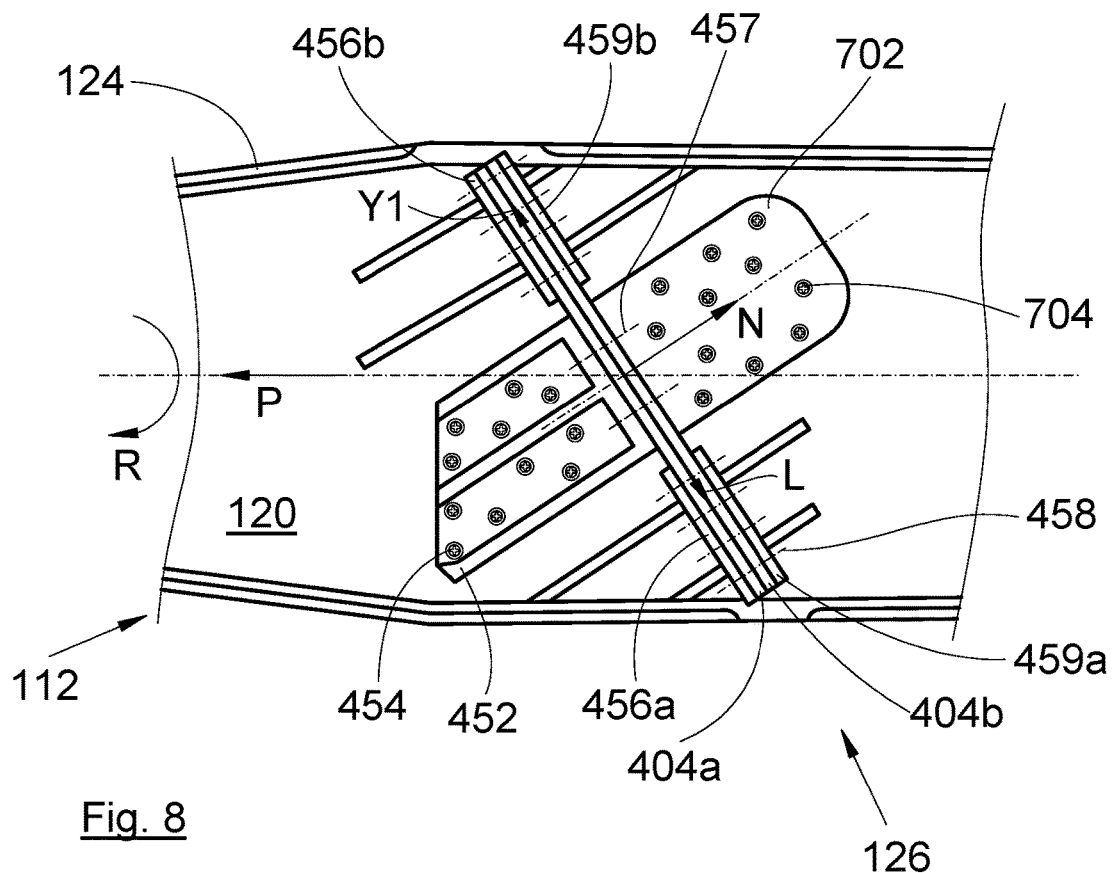
FIG. 8 shows a plan view of the assembly according to the invention.

FIG. 6 shows an example of a rear attachment 600 between the mounting pylon 110 and the wing 102 and which is arranged at the level of the rear closing rib 126a and which makes it possible to manage the relative elongation between the mounting pylon 110 and the wing 102.

The rear attachment 600 comprises two fittings 602a-b, where each comprises a base 608 fixed to the lower surface bottom skin 114 and a wall 610 which is parallel to the rear closing rib 126a and fixed against the rear closing rib 126a. The wall 610 is thus globally at right angles to the base 608.

The base 608 is fixed to the lower surface bottom skin 114 by vertical bolts 606 whose axes are at right angles to the lower surface bottom skin 114.

The wall 610 is fixed to the rear closing rib 126a by horizontal bolts 604 whose axes are at right angles to the rear closing rib 126a.

Furthermore, the moment of vertical axis R is balanced at the airfoil box 104 by two loads of adverse directions, namely a substantially horizontal load Y1 parallel to the fixing rib 126 transmitted by the bolts 302 and a substantially horizontal load Y2 parallel to the rear closing rib 126a transmitted by the bolts 604. Because of this, it is preferable to minimize the share of this moment of vertical axis absorbed by flexing-twisting of the fixing rib 126 which is therefore designed so as to minimize the flexural stresses deriving from the deformation of the primary box.

Here again, the walls 610 act as flexbeams allowing a differential displacement on X between the rear fixing rib 126a and the base 608. Here again, care will be taken, by acting on the geometry, to ensure that said flexural stresses do not exceed a third of the stresses induced in the plane of the plate.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft and comprising:
   a wing comprising an airfoil box partly produced using a front spar,
   a mounting pylon arranged under the wing and comprising a primary structure formed as a primary box having a top spar extending at least partly under the airfoil box and having a slit, a bottom spar, lateral panels and a transverse reinforcing fixing rib, of which a bottom part is housed and fixed inside the primary structure and of which a top part passes through the slit,
   fixing means which ensure the fixing of the top part to the front spar and where the fixing means comprise a plurality of fixing bolts, where each fixing bolt fixes the top part to the front spar and has its axis at right angles to the fixing rib,
   additional fixing means arranged between the top spar and the fixing rib comprising:
      a first central angle iron fixed to the top spar by first bolts with axes at right angles to the top spar,
      a second central angle iron facing the first central angle iron and fixed to the front spar by second bolts,
      wherein the first central angle iron and the second central angle iron are arranged on either side of the fixing rib, and
      additional bolts with axes at right angles to the fixing rib which fix the second central angle iron to the first central angle iron through the fixing rib,
   on either side of the first central angle iron:
      a first ply of the top spar, wherein each of the first plies has an inner face bearing against a face of the fixing rib;
      two second plies, wherein each second ply is arranged facing a first ply and has an inner face bearing against the other face of the fixing rib; and
      through bolts which pass through the fixing rib and the two facing plies so as to clamp the two facing plies against the fixing rib.

2. The assembly according to claim 1, wherein the fixing rib comprises at least two blades affixed against one another.

3. The assembly according to claim 1, wherein the fixing of the fixing bolts in the front spar is seal-tight.

4. The assembly according to claim 1, wherein the top part has a U shape, wherein the assembly comprises, for each branch of the U shape, a plate inserted between the front spar and the branch of the U shape, in that each plate has a shoe which is pressed and fixed against the front spar and which has bores whose axes are at right angles to the fixing rib and which receive anchoring bolts which fix the shoe and the front spar, and in that a nut of each fixing bolt is incorporated in the plate.

5. The assembly according to claim 4, further comprising flexible washers arranged between the plate and the fixing rib and between the fixing rib and a head of each fixing bolt.

6. The assembly according to claim 1, wherein the primary box forming the primary structure has a rear closing rib closing the rear of the primary box, wherein the airfoil box is also formed by a lower surface bottom skin, and wherein the assembly comprises a rear attachment comprising two fittings, where each fitting comprises a base fixed to the lower surface bottom skin by vertical bolts whose axes are at right angles to the lower surface bottom skin, and a wall which is parallel to the rear closing rib and fixed against the rear closing rib by horizontal bolts whose axes are at right angles to the rear closing rib, where the walls of the two fittings act as flexbeams allowing a differential displacement perpendicular to the walls of the two fittings.

7. An aircraft comprising at least one assembly according to claim 1.

* * * * *